(12) United States Patent
Spiro

(10) Patent No.: US 8,035,897 B2
(45) Date of Patent: Oct. 11, 2011

(54) MONOLITHIC LENTICULAR CARD

(75) Inventor: Steven Spiro, Chappaqua, NY (US)

(73) Assignee: Tracer Imaging LLC, White Plains, NY (US)

( * ) Notice: Subject to any disclaimer, the term of this patent is extended or adjusted under 35 U.S.C. 154(b) by 60 days.

(21) Appl. No.: 12/573,481

(22) Filed: Oct. 5, 2009

(65) Prior Publication Data

US 2010/0110555 A1  May 6, 2010

Related U.S. Application Data

(60) Provisional application No. 61/195,447, filed on Oct. 7, 2008, provisional application No. 61/228,834, filed on Jul. 27, 2009.

(51) Int. Cl.
*G02B 27/10* (2006.01)
*G06K 19/00* (2006.01)

(52) U.S. Cl. ........................ 359/619; 235/487

(58) Field of Classification Search .................. 359/619, 359/620; 235/487, 380, 375; 428/142, 156, 428/195, 1.4
See application file for complete search history.

(56) References Cited

U.S. PATENT DOCUMENTS

| | | | |
|---|---|---|---|
| 6,900,944 B2 * | 5/2005 | Tomczyk | 359/619 |
| 2004/0244901 A1 * | 12/2004 | Trapani et al. | 156/219 |
| 2009/0168165 A1 * | 7/2009 | Hoffman | 359/463 |

* cited by examiner

*Primary Examiner* — Mohammed Hasan
(74) *Attorney, Agent, or Firm* — Leason Ellis LLP

(57) ABSTRACT

In one embodiment of the present invention, a process for making a lenticular card includes the steps of: (a) providing a transparent sheet having a first planar side and a second side having a lenticulated region; and (b) forming a printed image on the first planar side. The printed image is formed from a plurality of inks including a first set of ink layers and a second ink layer that is disposed on the first set of ink layers and is located a greater distance from the first planar side. The first set of ink layers are formed from a first family of inks, while the second ink layer is formed from a second family of inks that has a different cure process compared to the first family of inks. The outer ink layer is a solvent-based continuous white topcoat, while the first set of ink layers that underlie the second ink layer is defined by a plurality of UV curable inks.

18 Claims, 1 Drawing Sheet

MONOLITHIC LENTICULAR CARD

CROSS REFERENCE TO RELATED APPLICATION

The present application claims the benefit of U.S. patent application Ser. No. 61/228,834, filed Jul. 27, 2009 and U.S. patent application Ser. No. 61/195,447, filed Oct. 7, 2008, which are hereby incorporated by reference in their entirety.

TECHNICAL FIELD

The present invention relates to the printing of lenticular images and more particularly, to improving the quality and durability of the printed imagery borne on the rear face of the lenticular lens sheet. Durability is of particular importance to lenticular applications in which the image is subject to friction or abrasion, or where data printed on the reverse of the cards is critical to the utility of functionality of the printed item.

BACKGROUND

Lenticular images typically employ cylindrical lens arrays which have been extruded and cut into standard size sheets. In current practice using conventional techniques, these sheets are usually reverse-printed on their flat, unlenticulated side with a specially prepared interlaced image. Because the lens arrays allow the image to vary with the angle of view, lenticular images can be given diverse properties of apparent depth and animation. These qualities have long been found to be highly effective in advertising, marketing, and promotion. In addition, these qualities are perceived as having a degree of interest and value apart from the initial visual encounter.

A large commercial industry is the sale of standardized transaction cards. These transaction cards take any number of different forms and can be in the form of durable phone, gift, membership, loyalty and the like cards. These cards can be carried in a wallet or other portfolio from which the cards can be removed regularly for use in transactions. If a lenticular card is not suitably devised and constructed, friction and abrasion can degrade the usefulness of the card to both the card provider and the card user.

Lenticular transaction cards have therefore often been fabricated as complex laminations including multiple layers of film. Typically, in convention cards, the interlaced printing is protected by at least one film layer and many times is protected by more layers. Each of these layers must be adhered or fused to the other plies in the lamination. These laminations add complexity, are time-consuming, and also have been found to have a failure rate that is associated with the delamination of the plies over time. Materials, labor, automation costs, as well as intrinsic unreliability, have therefore limited the potential market for lenticular card service.

Lenticular transaction cards conventionally have a thickness of about 27-30 mils and can optionally include a barcode and/or a magnetic stripe to allow information to be magnetically stored and allow the cards to be processed at retailers in the same manner as credit and debit cards and the like. The cards can be imaged or printed using any number of different techniques, including but not limited to thermal and inkjet imaging methods. One preferred technique that has gained widespread use is compression lamination since this technique permits the transaction card to meet ISO specifications.

Three dimensional (3D) and other effects, like animating effects, in transaction cards using a lenticular lens layer is desirable; however, there are a number of challenges to manufacturing a card that meets the applicable standards and can obtain widespread success with consumers while at the same time being economically produced. More specifically, in order to meet standards and gain widespread use, the lenticular card has to be about 27-30 mils in total thickness, have an encodable magnetic stripe, be thermally or ink jet imageable and be capable of mass production in an economically feasible manner.

There is therefore a need for an improved manner of producing a lenticular transaction card that overcomes the deficiencies of the conventional manufacturing techniques and provides cards that meet applicable standards for transaction cards and the like.

SUMMARY

In one embodiment of the present invention, a process for making a lenticular card includes the steps of: (a) providing a transparent sheet having a first planar side and a second side having a lenticulated region; and (b) forming a printed image on the first planar side. The printed image is formed from a plurality of inks including a first set of ink layers and an outer ink layer that is disposed on the first set of ink layers and is located a greater distance from the first planar side. The first set of ink layers are formed from a first family of inks, while the outer ink layer is formed from a second family of inks that has a different cure process compared to the first family of inks. The outer ink layer can be a solvent-based continuous white topcoat, while the first set of ink layers that underlie the outer ink layer is defined by a plurality of UV curable inks.

In another embodiment, a monolithic lenticular card consists essentially of a transparent sheet having a first planar side and a second side having a lenticulated region and a printed image on the first planar side. The transparent sheet can be in the form of a 27-30 mils 62-150 LPI clear lens and the printed image is formed from a plurality of inks including an outer ink layer that is an opaque white layer. The monolithic card has a final thickness of about 27-30 mils which is achieved by only the presence of the transparent sheet and the printed image.

These and other aspects, features and advantages shall be apparent from the accompanying Drawings and description of certain embodiments of the invention.

DETAILED DESCRIPTION OF CERTAIN EMBODIMENTS OF THE INVENTION

Figure 1:
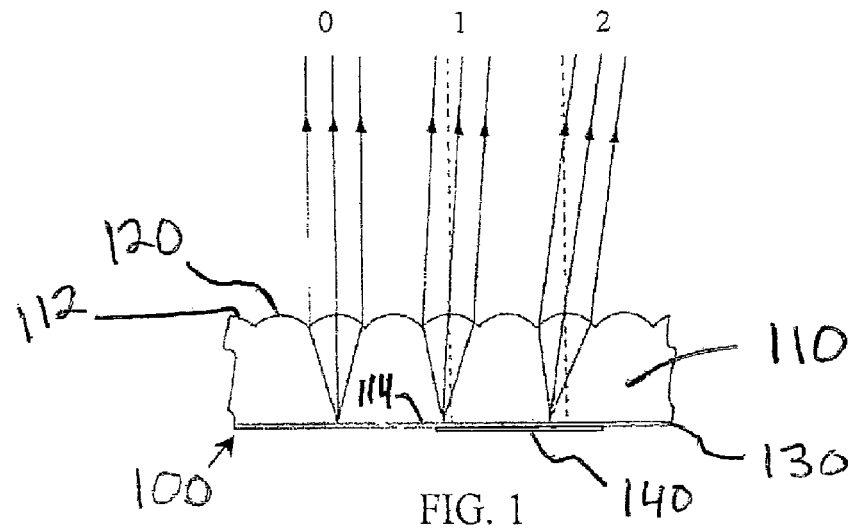
FIG. 1 is a cross-sectional view of a monolithic lenticular card made in accordance with one embodiment of the present invention with a lenticular lens being formed on a front surface thereof.

"Transparent" as used in "transparent sheet" includes clear, semi-transparent, translucent, and the like adjectives that describe the ability of the sheet to either or both: transmit at least some light energy from a light or radiation source to the adhesive layer to effectuate the photocuring of the adhesive, or alternatively, to transmit at least some light energy from a light or radiation source to the image layer to permit visualization or detection of the imager by an observer or a machine.

"Mils" or "mils" or "mil" is a unit of length equal to one thousandth ($10^{-3}$) of an inch (0.0254 millimeter), used to specify, for example, the thickness of sheet materials.

Lenticular printing from the reverse side of a lenticular the lens array has become a common practice and is now typically the preferred printing technique in lenticular card manufacturing compared to the prior practice of adhering a preprinted image on paper to a lens. However, if the lenticular image is to be viewed in reflection rather than in transmission, it is necessary to cover the cured printing ink with an opaque layer. Typically, this layer is either a heavy coat of white ink or a white polymer film that has a thickness of about 2 to 5 mils. The method of using white ink is generally less expensive than those using a polymer film but unfortunately, this method suffers from some deficiencies and in particular, this method has been found to be prone to degradation through wear and use.

In one embodiment, the present invention relates to the practical application of lenticular imaging technology to the standards and performance demands of card manufacturers. Both disciplines have constraints on their dimension and these parameters must be correlated in order to deliver a satisfactory product that can gain widespread use. Almost without exception, lenticular lens sheets are devised with a thickness dimension elected so that the interlaced lenticular image content is applied at the focal length of the lenses.

Standard nominal lens thicknesses are about 14 mils, 18 mils and 27 mils. The 14 mils thickness lens typically corresponds to 100 lenses per inch, while the 18 mils thickness lens typically corresponds to 75 lenses per inch (i.e., "75 LPI"), and the 27 mils thickness lens typically corresponds to 62 lenses per inch (62 LPI). It will be understood and appreciated that the use of a 27 mils thickness lenticular base sheet would bring the finished, printed image to the vicinity of 0.8 mm (30 mils).

Transaction cards typically are in the form of barcode and/or a magnetic stripe card which is a type of card that is capable of storing data by modifying the magnetism of minute iron-based magnetic particles on a band of magnetic material on the card. A barcode is an optical machine-readable representation of data. One type of barcode represents data in the widths and the spacings of parallel lines. Barcodes also come in patterns of squares, dots, hexagons and other geometric patterns. Although machine-readable encoding systems often use such nonlinear symbols instead of or in addition to bars, they are nevertheless commonly referred to as barcodes.

The magnetic stripe (often times called a "magstripe") is read by physical contact and swiping past a reading head that reads the magnetic information. Magnetic stripe cards are commonly applied, for example, to credit cards, identity cards, gift cards, service cards, and transportation tickets to name just a few of the more common applications one sees in everyday life.

One of the applicable standards governing these types of cards is the ISO CR-80 card specification that is most commonly used for phone, ATM, gift, store credit, membership, promotional, loyalty, frequency, debit, identification, security, access entry, hotel door key applications, etc. The CR-80 standard requires the card to have the following dimensions: 85.60 mm×53.98 mm×0.80 mm (3.375"×2.125"×0.030"). Another standard governing this technical field is ISO CR-50. A CR-50 card is a plastic card that is typically 0.60 mm thick; however, this dimension is electively variable. The CR50 card dimensions are approximately 76.2 mm×43.8 mm (3.5"×1.75").

More broadly, a number of International Organization for Standardization standards (e.g., ISO 7810, ISO 7822, ISO 7812, ISO 7813, and ISO 4909) define the physical properties of standard cards, including size, flexibility, location of the barcode and/or a magnetic stripe and magnetic characteristics. These standards also provide standards for financial cards, including the allocation of card number ranges to different card-issuing institutions. ISO7816 relates particularly to the class commonly referred to as "smart cards," and their particular performance expectations.

Barcoding is typically printed using a dark ink on a light background. As such optical readability depends on the sharpness and contrast of the geometric symbols, a matte black pattern on a white background is considered optimal. This use of matte black ink discourages stray reflections from extraneous light sources which might lead to a misreading of the bar code data. Barcode data can relate to the individual user or institution utilizing the card, or can relate to a large organization such as a bank or other card provider. Barcode printing is provided most conveniently by the printing system best suited to the volume of cards being encoded. For example, at relatively low volumes, barcodes may be printed by inkjet or thermal means, while in high volumes the barcode may be printed lithographically.

A magnetic stripe feature can be applied to a card by various methods. For example, the stripe can be transferred onto the card by hot stamping or alternatively, by the application of a magnetic slurry to the card in a process analogous to printing. The election of a particular method depends on the specified performance parameters. This can include the material's coercivity or any other quality that is particular to magnetic materials.

Lenticular imaging has a long history that carries its own specific understandings. The quality of any particular lenticular effect is known to depend on the number of different views the comprehensive process can yield. In the practice of offset lithography, the practical ceiling on the number of visually attainable views is set by the limits of resolution within the lithographic printing process.

Accordingly, it will be appreciated that the best effect is generally obtained by the thickest material that the predetermined conditions will tolerate. However, in a number of lenticular printing applications, relatively thin lens material is preferred in an effort to reduce overall material and manufacturing costs due to the costs of the raw polymer material.

However, in lenticular card manufacture, the thickness is commonly fixed by the industry as described above with respect to the governing standards for different card applications. Under these conditions, both the most dramatic visual impression and the lowest cost can be provided by the use of a lenticular base sheet that approaches the final thickness that is recited in the card specification (e.g., ISO standard). If the lenticular lens stock is substantially thinner than the requisite card dimension, then one or more additional layers are applied in order to build up the lenticular base sheet. As a result, both the cost and complexity of the manufacturing process increase.

For example, if a standard 18 mils lenticular lens sheet is chosen, an additional 12 mils of thickness is provided in order for the card to have the thickness required in the applicable standard. Conventionally, this difference has been made up by the application of one or more polymers films. In the manufacture of transaction cards, the use of 18 mils transparent sheets is commonplace and is the norm since conventional cards are laminated structures that begin with the transparent lens and then add additional layers, substrates and backing layers to achieve the proper thickness.

The sequence and resulting structure of the applied materials can be further appreciated with reference to the accompanying drawing figures. FIG. 1 is a cross-sectional figure that shows a monolithic lenticular card 100 made in accordance with one embodiment of the present invention. The lenticular card 100 includes a lenticular lens array 110 that carries a plurality of lenticular lenses 120 on a first surface 112. The lens array 110 includes a planar reverse surface 114 that carries print layers 130. A magnetic stripe 140 is applied after curing the print layers 130 using conventional techniques that are suitable for the intended application. In addition, the lenticular card 100 can include additional features not shown in the present figures. These additional features can include a signature stripe, radio-frequency related structures, as well as "smart card" components to name just a few.

Figure 2:
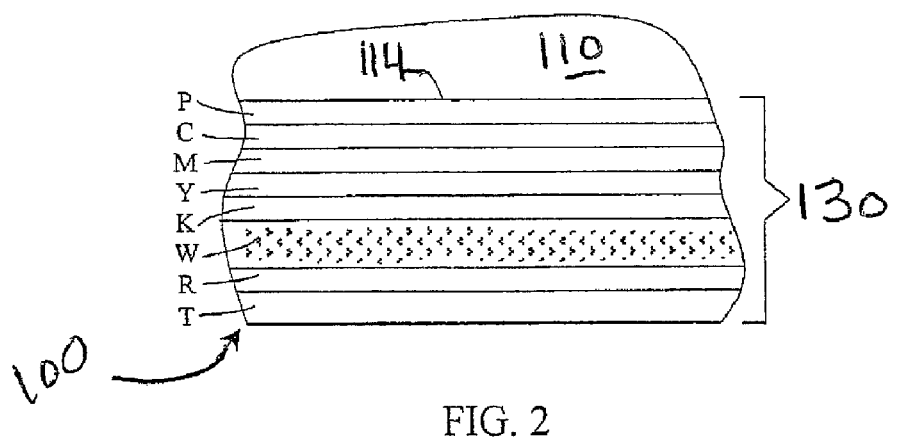
FIG. 2 is a cross-sectional view of a portion of the lenticular card of FIG. 1 showing the layers of printing employed therein.

FIG. 2 is cross-sectional view that illustrates the print layers 130 in greater detail and the manner in which the print layers 130 are layered relative to the lenticular lens array 110. The planar reverse surface 114 first receives the primer layer P. Next cyan (C), magenta (M), yellow (Y), and black (K) are then applied in succession. As discussed below, this type of printing is referred to as a 4-color process. A white coat (W) follows and as mentioned below, the white coat can be a white ink composition or it can be a white ink composition combined with silver ink (e.g., 98% white ink/2% metallic silver ink—as measured by weight). Optionally, reverse side printing (R) can be applied over the white coating. A transparent coat (T) can then be applied to provide gloss and additional wear resistance.

Any number of different printing techniques can be used to foam the print layers 130 so long as they are suitable for the intended application. For example, an offset printing process can be used. As is known, offset printing is a commonly used printing technique where the inked image is transferred (or "offset") from a plate to a rubber blanket, then to the printing surface. When used in combination with the lithographic process, which is based on the repulsion of oil and water, the offset technique employs a flat (planographic) image carrier on which the image to be printed obtains ink from ink rollers, while the non-printing area attracts a water-based film, thereby keeping the non-printing areas ink-free. A four-color process printing is a system where a color image is separated into 4 different color values by the user of filters and screens (typically performed digitally). The result is a color separation of 4 images that when transferred to printing plates and printed on a printing press with the colored inks cyan (blue), magenta (red), yellow and black, reproduces the original color image.

The printed image areas are typically printed in "reverse-read" format, that is, reversed, backwards or mirror image, such that the resulting image when viewed through the outer surface of the transparent lenticular sheet by an observer or machine sensor is "right-read" such that the highest possible original image is retained in the observed printed image. The printed image areas typically include a colored ink, for example, one or more conventional litho-ink formulations or UV curable inks. The printed image areas can include one or many colored inks, such as from 2 to about 10 different colored inks, for example, with a single primary color (R, G, B), four color process color (C, M, Y, K), white (W), a custom or spot color, such as those known colors from PANTONE®, and the like suppliers, and combination thereof.

Figure 3:
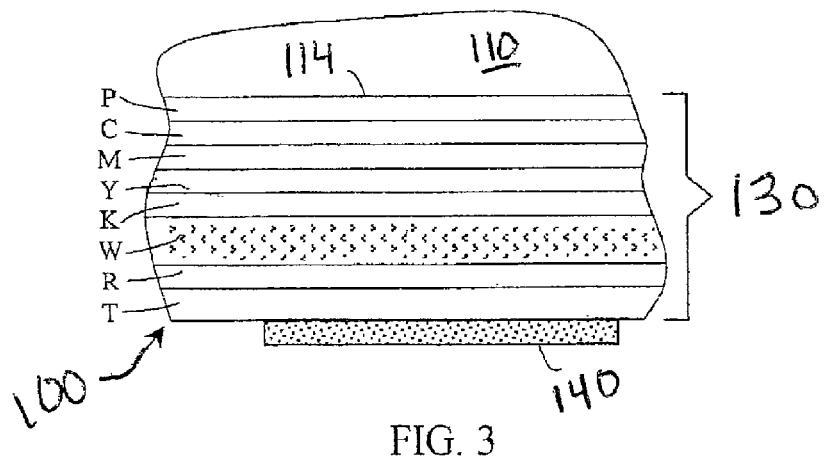
FIG. 3 is a cross-sectional view of a portion of the lenticular card of FIG. 1 showing not only the layers of printing employed therein but also a magnetic stripe incorporated therein.

FIG. 3 is a cross-sectional view of the card 100 of FIG. 2 with the magnetic stripe 140 applied thereto. As shown, the magnetic stripe 140 is applied to the bottommost surface of the card 100 and therefore, is applied onto the bottommost layer of the print layers 130 which in this case is the optional transparent coat (T). Once printing is accomplished, the magnetic stripe 140 can be applied by any suitable technique. It will be appreciated that while the drawing figures depict reverse side printing in the interest of clarity and simplicity as having only a single color channel; however, the present invention also embodies the application of plural and successive ink layers to achieve desired colors or reflectance properties. Reverse-side printing can include four-color imagery, metallic or iridescent inks and other graphic effects without departing from the spirit of the present invention.

It will further be appreciated that the thickness of the accumulated ink layers can be conscientiously controlled by modulating various properties of the inks, such as ink type, volumetric shrinkage values, solids content, etc. For example, solvent-based inks can be employed successfully in the manufacturing process as set forth herein.

In accordance with one embodiment of the present invention, a card manufacturing process includes the step of applying a specifically selected primer formulation as a receiving agent for the printed, interlaced imagery. Subsequently, a coat of opaque ink which is typically a white formulation is applied. The primer accepts successive printing layers and provides an intimate bond between the lenticular lens and the inks via the primer.

In yet another embodiment, the present invention discloses methods for opacifying a flood coat applied between the reverse-printed interlaced image and any subsequently applied image or text. Complete printing of the card can include conventionally, optically invariable content that is visible from the reverse side of the card.

Applicant has discovered that a specific primer formulation having specific properties provided a number of advantages. More specifically, one preferred primer formulation is commercially available as a clear primer #52997 from Ashland Chemical located in Covington, Ky. This primer is especially efficacious in increasing the adhesion of the ink layers so that a durable end card is produced. However, it will be understood that other primers having similar formulations relative to the aforementioned one or others suitable for the intended use are also suitable for use in the manufacturing process described herein.

EXAMPLE 1

In testing the #52997 primer, 4 lots of 60 sheets each were prepared. Each lot was coated using the #52997 primer and all sheets were printed on the 62 LPI lens (27 mils). Without any inks applied, the lens thus has a thickness of about 27 mils and with printing completed, the 62 LPI lenticular lens stock measured 28 to 29 mils depending upon the number of layers and the manner of application. Increasing the thickness of the card can be readily achieved, if desired, by the application of a thicker white flood coat and by utilizing other techniques described herein.

EXAMPLE 2

In yet another embodiment of the present invention, silver ink was nominally applied in order to increase the opacity of the flood coat. Nominally silver ink is produced by introducing flakes or particles of aluminum or other reflective metal into a transparent binder. In the above example where 4 lots were tested, lot 1 contained a conventional white ink flood; lot 2 contained a conventional white ink flood with a clear coat;

lot 3 contained a UV white ink flood with 2% silver ink added; and lot 4 contained a UV white ink flood with added 2% silver ink and clear coat. It will also be appreciated that other variations are equally possible within the scope of the present invention. For example, the silver ink need not be in a mixture with the white ink but can be a separate application between two coats of white ink in effect emulating a metallic foil barrier without the additional cost and complexity. The proportion of transparent binder in the metallic ink may electively be made relatively low in such cases. It may be appreciated that absent a predominant transparent carrier, metal flakes can have an increased propensity to orient into a single layer.

EXAMPLE 3

In yet another embodiment of the present invention, the present applicant has discovered that the use of different families (classes) of inks in the print layer of the lenticular card yields superior results compared to using only a single ink family. In particular and as described herein, the print layer is formed of a number of different color layers, as shown in the figures, and applicant has discovered that improved results are obtained when select layers of the print layer are formed with inks belonging to a first class (first family) of inks and combined with other select layers of the print layer that are formed with inks belonging to a second class (second family).

One of the most popular families of inks is UV-cure based inks. UV inks cure by the linking of short, monomer building blocks into long polymer chains. The reaction initiates in UV inks when (UV) light triggers a chemical photoinitiator and begins the polymerization. UV inks are therefore often described as being "solvent-free" or post-cure, as 100% solids.

Any number of UV curable printing inks that are commercially available from a number of different sources can be used in the practice of the present invention so long as they are suitable for the intended purpose.

Conversely, another family of inks is solvent-based inks that cure by the evaporation of the solvent. Conventionally, a product, such as a lenticular product, has been formed of only a single ink family in that the entire print layer is formed of the same ink family. The conventional belief was that mixing of families of inks would yield inferior results since solvent-based inks were believed to not be able to adhere to UV inks and vice versa due to chemical bonding issues between the two families of ink and due to the different chemical structures of each.

In accordance with the present invention, multiple families of inks are used in the formation of the print layer. More specifically, the present invention teaches the combination of underlying color separations of UV inks with the subsequent application of a "flood coat" of a solvent-based white color ink. Accordingly, the underlying color separations are formed of inks that cure when exposed to UV inks, while the white layer is formed of ink that cures by the evaporation of solvent.

Applicant has discovered that the combination of two different families of inks in generating the print layer has led to a number of advantages. In particular, the formation of the print layer in the aforementioned manner results in a card that has increased durability and also provides a number of other advantages, such as processability and cutability, while at the same time complying with all applicable standards governing the intended application.

Owing to the simplicity of construction in the lenticular cards herein described, existing printing inks tailored to the card industry are not particularly suited to enhancing the features of the present invention. For example, the IJV SICURA CARD 110N WA (SIEGWERK) lithographic ink series is expressly formulated to withstand the lamination process that the present invention intentionally obviates.

In the case of screen printing inks, the process of printing through a regular mesh often results in the entrainment of air in the form fine bubbles. Even if the bubbles eventually rupture, the interaction of the screen, ink, and curing process can result in a variety of finish defects. These defects are known by such terms as foaming, reticulation, fish-eye, orange peel, or pinholing.

Irrespective of the terms of description, these inconsistencies result from an inability of the ink to flow out to a level surface. Their visible irregularity can undermine the common rationale for the use of screen printing, namely, that screen printing delivers a greater volume of ink to the substrate and therefore provides greater opacity, increased brightness, and more higher visual quality.

Therefore, to improve flow-out and avoid these defects, screen-printing inks have traditionally been formulated to include a combination of waxes, silicones, and surfactants. While improving the finished surface appearance of screen inks, these additives have had the unfortunate side effects of reducing adhesion, both to the substrate and to any subsequent ink application. Accordingly, wax, silicone, and surfactant free inks have been successfully tested and are now available from a small number of vendors.

In pursuit of the goals of the invention, the insufficiency in the adhesion provided by screen-printing inks using conventional wax, silicone, and surfactant antifoaming and leveling agents has been revealed in certain cases by exposure to scratching, cutting, or abrasion, both in the course of industrial conversion and handling of the product and in its subsequent use. Furthermore, many inks containing silicone are resistant to the application of additional inks or dyes.

These limitations make many screen printing inks unacceptable under the relatively harsh conditions to which service cards can be subjected. Furthermore, the lubricant properties of the standard additives discourage to desired attachment of such features as additional printed data, personalization, magnetic stripes, or foil-transfer security devices. We have found that silicone-free inks can be devised to have a dyne level such that they can be thermally imprinted in manner consistent with the expectations of the service card industry.

For example, UV-curable RH0037510 Flat Bed Screen Opaque White (Zeller+Gmelin) has been applied in single and double passes at mesh values including 230 and 335 lines per inch. The coated surface was then tested in combination with a Zebra/Eltron 310P thermal color printer and found to provide much deeper contrast and color saturation than any commercially available ink containing silicone. Foil Bond RH3027297 is a compatible primer which is available from the same manufacturer.

Unlike many opaque white inks, UV-curable RH0037510 UV white imparts a gloss finish. It therefore does not require the additional step of applying a clear gloss varnish. In addition to this ease of manufacture and visual quality, it can provide a surface that is particularly amenable to the graphic and functional modifications imparted by subsequent requisites of service card processing.

EXAMPLE 4

Materials and Layer Specifications
Transparent Sheet: 27 mils 62 LPI Clear Lens
Image Inks: 4-Color Process UV Litho-Inks; Opaque White Solvent-Based Ink
Process:

A lenticulated (lenticular) transaction card, according to one embodiment of the present invention, that meets the application ISO standards and has a thickness of about 30 mils is manufactured by beginning with a transparent sheet in the form of a 27 mils 62 LPI clear lens. The preparation of lenticular images involves a set of operations. In an exemplary process, the lenticular lens is extruded to 27 mils (0.69 mm) thickness. The extrusion process is carried out between two cylinders having parallel axes. One cylinder carries a grooved relief pattern, while the other cylinder bears a smooth external surface. The lens sheet is therefore typically extruded so that the lens surfaces are borne on only one side of the sheet, while the opposite side is made substantially planar. The individual lenticular lens geometry is most often described by a section of a cylinder, although departures from mathematical cylindricality are known in the industry. Diverse polymers are suitable for use in such an extrusion process. For example, Lenstar brand copolymer, commercially available from Eastman Chemical, is a material expressly formulated for the lenticular trade and is especially suitable for the present application. However, a wide range of polymers are employed in the trade, including polyethylene terephthalate (PET) and associated formulations such as PETG (glycolized PET) and APET (amorphous PET). Although the planar surface of the lens may in some cases be printed directly, adhesion is often promoted through one or more forms of surface treatment. In the present example, lens is primed on a UV Litho Press using the #52997 primer, discussed hereinbefore, onto the planar side of the lens sheet.

In a practice well understood in the lenticular trade, a set of image files are selected, edited, and converted via software so that the digital files are interlaced into a composite document. The image processing yields an interlaced image combining and interspersing the original image data into a series of image bands. Interlacing software permits the customization of the pitch of the image bands with a fine degree of control. In this example, the image is output so that it matches or nearly matches the pitch of the cylindrical lenticules. In other words, the 27 mils clear 62 LPI lenticular lens was printed with an interlaced image matching the frequency of the 62 LPI pitch lenticular lens.

Additionally, the files are prepared using commercial layout software to allow for a 72-up card format.

After formatting, the files are ripped into 1-bit Tagged Image File Format data (TIFFs). It will be appreciated that other formats can be used such as continuous—tone files. One-bit TIFF (OBTi) files are an efficient and widespread document format in the printing trade. It should nevertheless be appreciated that grayscale or continuous-tone files may at other times be usefully employed. The composed 1-bit TIFFs are written onto the lithographic plates using plate making device that ultimately results in the collective image being etched into one or more lithographic plates. A four-color image is typical, although more or fewer color channels may be elected. In the case of standard four-color printing, each color plate (CMYK) is independently mounted on a lithographic press. The press can be a machine specifically manufactured for the application and curing of radiation-curable inks. Radiation-curable inks are often called UV inks owing to their responsiveness to ultraviolet radiation. Next, the primed lens is run for a second time through the UV lithographic press to receive the 72-card format imagery. In this example, a radiation-curable CMYK ink series is applied over the primer. Many presses are outfitted with additional stages beyond those necessary for a four-color process. Therefore, subsequent to the imprinting of the CMYK color separations, an opaque, white ink may be laid down onto the flat side of the lens in an in-line printing process. The white ink layer serves as a diffuse reflector and opacifier so that the lenticular image may be readily observed in reflection, and so that the reverse may carry additional imagery, indicia, or functional surface features.

As discussed above, the printed interlaced image is formed of two different families of inks, namely, a UV-curable ink(s) and a solvent-based ink. In accordance with the present invention, the underlying layers of the printed image that are formed on a smooth, planar surface of the transparent sheet are formed with UV-curable inks, while the outer flood coat of white ink is a solvent-based ink. The inks can be laid down using conventional printing processes such as an off-set printing process.

Typically, a clear coat layer is formed on the exposed white ink layer (the backside of the card). Generally, a clear coat refers to a clear (non-pigmented) top coat that is applied over a colored area (colored paint or a colored, printed image in the case of a lenticulated card). A clear coat increases the durability of the backside of the transaction card and also increases the gloss thereof and the resistance to harmful environmental effects. Applicant respectfully notes that this type of clear coat layer is different than applying a backside primer layer as is taught in other conventional processes since the primer layer is not only chemically different but is also intended and formulated to provide a surface on which a printed image can be formed. In the case of the present invention, the clear coat is a finished layer of the printed surface and thus the transaction card itself and is intended and used for purposes of providing a glossy surface, and increasing the durability of the card. The clear coat pervades the surface to the margins of the card, having the further effect of reinforcing the ink strata at the card edges when the cards are subsequently cut and parted from the sheet. Notwithstanding the intent within the invention of providing a durable clear topcoat, it may be appreciated that such cards are commonly modified later in the production pathway by the superficial application of security or personalization features. Such features may be locally applied by inkjet printing, dye sublimation, thermal transfer, or other suitable medium. As the provision of such features does not undermine the advantages of the clear coat, they should not be taken to subvert the value or reach of the invention. Therefore, within this description of the invention the term "outer" as it pertains to an ink with a succession of ink strata should not be understood as of necessity meaning an absolute, continuous and unmodified exposed surface.

The transaction cards described above can then be processed by a third party, such as a bank or retailer, by using a UV litho printing process to disposed one or more colors on the backside and the imprints using ink jet, die-sup or other digital print means.

Lamps, such as metal halide or mercury lamps, and irradiation from the UV lamps was used to cure the UV curable printed inks. The solvent-based white ink coating cures by an evaporation process.

One or more process colors or PANTONE® Matching System (PMS, i.e., a color standard for non-process colors) colors can be printed in conjunction with, or in place of, the 4-color process image. The total thickness of the imaged transparent sheet, that is, the lenticular sheet plus printed image is about 30 mils, thereby complying with the applicable standards for transaction cards. It will be appreciated that this is achieved without the use of backing materials, such a substrates and the like, and is free of any lamination.

It will be appreciated that the above process begins with a 27 mils clear lens in direct contrast to the conventional practice of producing lenticular transaction cards by using an 18 mils 75 LPI clear lens as the starting material for the transparent sheet component of the lenticular card. As a result, the card does not have to be "built up" with multiple layers which can include backing layers or substrates that are layered on the existing lens and print image layer and then the entire structure is laminated to form the complete transaction card.

Applicant conducted a number of tests to compare (1) monolithic lenticular transaction cards formed entirely with UV curable inks (i.e., 4-color process inks and the opaque white ink were all UV-curable inks) (referred to hereinafter as "first type cards") with (2) those cards made with a print image formed of UV-curable inks as the underlying print image layer and a solvent-based white flood coat (referred to hereinafter as "second type cards"). More specifically, the following tests were performed on different test products that were either classified as being either a first or second type card: (A) observations on the silkscreen white coating (various ink sets were tested in silkscreen and tests run at 75 fpm with UV lamps at 100% power); (B) observations on the off-set UV-printed back copy (back copy printed on a Komori 40" 6-color off-set process with UV drying and tape adheration tests were to evaluate the black text to the silkscreen printed surface); and (C) observations on the roll on mag tape (magnetic stripe) (two types of roll on tape applications were used—Franklin one-up process and full size 72-up AP process).

With regard to the first test (observations on the silkscreen white coating), the first type cards that were tested did not perform satisfactory and a number of deficiencies were noted. For example, the test card exhibited an overall very poor scratch resistance and the silkscreen white coating bonded poorly with the off-set white. In contrast, the second type cards (solvent-based white coat on top of UV curable print layers) provided superior results compared to the first card type based on its improved scratch resistance and bonding.

With regard to the second test (observations on the off-set UV-printed back copy), the first card type offered mixed results with a number of products having minor black copy pull back with the tape test. In contrast, the second type card provided improved results.

With regard to the third test, the first type of cards generally had poor adhesion and the pull test many times resulted in everything being pulled off. When the second type of card was tested, improved results were observed in that increased adhesion was noted.

Applicant discovered that the second card type offered improved opacity, cutability and printability relative to the first card type.

Returning now to FIG. 1, the simplicity and utility of the present invention will be readily understood. The lenticular properties of the lenticular cards described herein and made in accordance with the present invention permit a high quality, visually variable image to be obtained as the observer moves through a succession of positions as suggested by axial position 2, intermediate position 2, and marginal position 3. The present invention provides a simple, effective and efficient alternative to the prior practice by means of the conscientious preparation and use of printable materials. In the embodiment where silver inks are used, the metal particulates in the silver ink increase the opacity and mask any ghost of the interlaced image the might otherwise show through a conventional white ink coat. The use of the primer disclosed herein greatly increases the adhesion and the abrasion resistance of the ink coatings. These practical properties are further enhanced by the optional clear coat. The result of these improvements is a lenticular card that is simpler, more cost-effective and more visually impressive than conventional cards.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A process for making a monolithic lenticular card comprising the steps of:
    providing a transparent sheet having a first planar side and a second side having a lenticulated region; and forming a printed image on the first planar side, wherein the printed image is formed from a plurality of inks including a first set of ink layers and a second ink layer that is disposed on the first set of ink layers and is further from the first planar side, the first set of ink layers being formed from of first ink family, while the second ink layer is formed from a second ink family that has a different cure process compared to the first ink family.

2. The process of claim 1, wherein the transparent sheet comprises a 27-30 mils 62-150 LPI clear lens.

3. The process of claim 1, wherein printed image areas on the transparent sheet comprise from 2 to about 10 different colored inks.

4. The process of claim 1, wherein the second ink layer comprises a coating of white ink.

5. The process of claim 1, wherein the first ink family comprises LTV curable inks.

6. The process of claim 1, wherein the second ink family comprises solvent-based inks.

7. The process of claim 1, further comprising applying a primer layer to the first planar side of the transparent sheet prior to forming the printed image.

8. The process of claim 1, wherein the second ink layer comprises a white ink flood coat that includes a predetermined amount of silver ink.

9. The process of claim 8, wherein the silver ink is present in an amount of about 2% by weight.

10. The process of claim 1, wherein the card has a thickness of about 30 mils.

11. The process of claim 1, wherein the first set of ink layers comprises four color process UV inks that are printed by means of an off-set printing process, the second ink layer being an opaque solvent-based white coat that is printed by means of an off-set printing process.

12. The process of claim 1, further comprising applying a clear coat to the second ink layer, the clear coat representing an exposed rear surface of the card.

13. A monolithic lenticular card consisting essentially of: a transparent sheet having a first planar side and a second side having a lenticulated region, wherein the transparent sheet comprises a 27 mils 62 LPI clear lens; and a printed image on the first planar side, wherein the printed image is formed from a plurality of inks including an opaque ink layer that comprises an opaque white layer, the card having a final thickness of about 30 mils which is defined by only the transparent sheet and the printed image, wherein the plurality of inks comprises a first set of ink layers that underlie the opaque ink layer, the first set of ink layers being formed from a first ink family, while the opaque ink layer is formed from a second ink family that has a different cure process compared to the first ink family.

14. The card of claim 13, wherein the first ink family comprises UV curable inks and the second ink family comprises solvent-based inks.

15. The card of claim 14, wherein the opaque ink layer comprises an opaque white ink.

16. The card of claim 13, wherein printed image areas on the transparent sheet comprise from 2 to about 10 different colored inks.

17. The card of claim 13, further comprising a clear coat that overlies the opaque ink layer, the clear coat representing an exposed rear surface of the card.

18. A monolithic lenticular card comprising: a transparent sheet having a first planar side and a second side having a lenticulated region; and a printed image on the first planar side, wherein the printed image is formed from a plurality of inks including a first set of ink layers and a second ink layer that is disposed on the first set of ink layers and is further from the first planar side, the first set of ink layers being formed of inks that have a first cure process, the second ink layer being formed of ink that has a second cure process that is different from the first cure process, wherein the second ink layer includes a predetermined amount of silver ink.

* * * * *

UNITED STATES PATENT AND TRADEMARK OFFICE
CERTIFICATE OF CORRECTION

| | | |
|---|---|---|
| PATENT NO. | : 8,035,897 B2 | Page 1 of 1 |
| APPLICATION NO. | : 12/573481 | |
| DATED | : October 11, 2011 | |
| INVENTOR(S) | : Steven Spiro | |

It is certified that error appears in the above-identified patent and that said Letters Patent is hereby corrected as shown below:

Column 12, Claims: Line 36, the text "The process of Claim 1, wherein the first ink family comprises LTV curable inks." should be "The process of Claim 1, wherein the first ink family comprises UV curable inks."

Signed and Sealed this
Nineteenth Day of January, 2016

Michelle K. Lee
*Director of the United States Patent and Trademark Office*